United States Patent
Farrow

(10) Patent No.: US 7,689,325 B2
(45) Date of Patent: Mar. 30, 2010

(54) COMMUNICATION CONTROL METHOD FOR A VEHICLE

(75) Inventor: Daniel W. Farrow, Oro Valley, AZ (US)

(73) Assignee: Delphi Technologies, Inc., Troy, MI (US)

( * ) Notice: Subject to any disclaimer, the term of this patent is extended or adjusted under 35 U.S.C. 154(b) by 773 days.

(21) Appl. No.: 11/494,786

(22) Filed: Jul. 26, 2006

(65) Prior Publication Data

US 2008/0046135 A1   Feb. 21, 2008

(51) Int. Cl.
G05D 1/00 (2006.01)
G05D 3/00 (2006.01)
G06F 7/00 (2006.01)
G06F 17/00 (2006.01)

(52) U.S. Cl. .......... 701/2; 701/1; 701/36; 455/3.01; 455/3.05; 455/517; 455/556.1; 455/556.2; 379/102.01; 379/102.02

(58) Field of Classification Search .......... 340/426.13, 340/426.16, 426.28, 426.29; 701/2, 1, 36, 701/49; 455/3.01, 3.02, 3.3, 3.04, 3.05, 345, 455/414.1, 420, 517, 556.1, 552.2, 557, 569.2; 379/1.04, 9, 9.01, 14, 10.02, 102.01, 102.02
See application file for complete search history.

(56) References Cited

U.S. PATENT DOCUMENTS

| | | | |
|---|---|---|---|
| 5,396,540 A * | 3/1995 | Gooch | 455/456.3 |
| 6,198,995 B1 * | 3/2001 | Settles et al. | 701/29 |
| 6,215,982 B1 * | 4/2001 | Trompower | 455/63.3 |
| 6,307,471 B1 * | 10/2001 | Xydis | 340/568.1 |
| 6,721,580 B1 * | 4/2004 | Moon | 455/574 |
| 6,782,262 B1 * | 8/2004 | Lundborg | 455/449 |
| 6,965,326 B2 * | 11/2005 | Allison | 340/999 |
| 7,012,993 B2 * | 3/2006 | Alton | 379/26.01 |
| 7,035,631 B2 * | 4/2006 | Schwinke et al. | 455/420 |
| 7,092,799 B2 * | 8/2006 | Oesterling et al. | 701/1 |
| 7,116,989 B2 * | 10/2006 | Mazzara et al. | 455/456.2 |
| 7,120,811 B1 * | 10/2006 | Bingi et al. | 713/324 |
| 7,123,907 B2 * | 10/2006 | Sumcad et al. | 455/423 |

(Continued)

OTHER PUBLICATIONS

Lineas Electronicas Corea, Inc, "Vehicle Monitoring System", Jan. 2005, pp. 1-23.*

(Continued)

*Primary Examiner*—Khoi Tran
*Assistant Examiner*—Jaime Figueroa
(74) *Attorney, Agent, or Firm*—Jimmy L. Funke

(57) ABSTRACT

A remote call center utilizes both cell phone and satellite communication networks to transmit data messages to a vehicle equipped with both a telematics module and a SDAR module. The telematics module and the SDAR module are both coupled to a vehicle data bus, and a software communication token containing a current budget is assigned to a selected module in response to a vehicle turn-off event. The module possessing the communication token determines the available signal strength on its respective communication network. If the available signal strength is adequate for reliable data communication with the call center, the module retains possession of the token and periodically wakes-up to check for incoming messages from the call center. If the available signal strength is inadequate, the module possessing the token passes the token to the other module, after which that module periodically wakes-up to check for incoming messages from the call center.

3 Claims, 2 Drawing Sheets

U.S. PATENT DOCUMENTS

| | | | |
|---|---|---|---|
| 7,130,633 B2 * | 10/2006 | Kamdar et al. | 455/445 |
| 7,254,375 B2 * | 8/2007 | Conner et al. | 455/92 |
| 7,289,024 B2 * | 10/2007 | Sumcad et al. | 340/539.17 |
| 7,312,691 B2 * | 12/2007 | Zambo et al. | 340/5.72 |
| 2005/0134504 A1 * | 6/2005 | Harwood et al. | 342/357.14 |
| 2005/0166263 A1 * | 7/2005 | Nanopoulos et al. | 726/7 |
| 2005/0265273 A1 * | 12/2005 | Karabinis et al. | 370/316 |

OTHER PUBLICATIONS

EP Search Report dated Jan. 2, 2008.

* cited by examiner

COMMUNICATION CONTROL METHOD FOR A VEHICLE

TECHNICAL FIELD

The present invention relates to wireless communications between vehicle control modules and a remote facility, and more particularly to a vehicular communication control method that optimizes communication reliability.

BACKGROUND OF THE INVENTION

Many modern vehicles are equipped with one or more wireless control modules that communicate with a remote message transmission facility such as a "call center". The most prevalent wireless control module is a so-called "telematics" module that communicates with a remote call center by way of a cell phone network. In addition to supporting voice communications, a telematics module is frequently configured to transmit and receive digital data, even when the vehicle is inactive. For example, the telematics module can be configured to receive vehicle control commands from the call center for activating certain electrical components of the vehicle for unlocking the doors, sounding the horn or flashing the headlights when requested by the vehicle owner or other authorized person.

Wireless modules designed to be operational when the vehicle is inactive are typically assigned a "current budget" at vehicle turn-off in order to prevent excessive power consumption during prolonged periods of vehicle inactivity. A commonly employed power-saving technique places the module in a "sleep" (minimum power consumption) mode at vehicle turn-off, which is occasionally exited when a "wake-up" event occurs. Ordinarily, the wake-up events occur periodically, such as once every five minutes, at which time the module checks for an incoming message from the remote call center. The module services any received messages, deducts the current budget for the power consumed, and then returns to the sleep mode. This process of periodically waking-up and then returning to the sleep mode continues until the vehicle is re-started or the current budget is reduced to zero.

Telematics modules perform as desired except when the vehicle is parked in a location that is not adequately served by the cell phone network. In such instances, communications from the call center cannot be reliably received, and the remote vehicle control functionality is lost. This occurs even when the vehicle is equipped with other wireless control modules such as a satellite digital audio receiver (SDAR) module. Accordingly, what is needed is a communication control method for fully utilizing the communication capability of a vehicle during periods of inactivity.

SUMMARY OF THE INVENTION

The present invention is directed to an improved method of controlling communications between a remote call center and a vehicle equipped with both a telematics module and a SDAR module, where the call center transmits data messages to the vehicle over both the cell phone communication network and the satellite communication network. The telematics module and the SDAR module are both coupled to a vehicle data bus, and a software token containing a current budget is assigned to the telematics module (or alternately, the SDAR module) in response to a vehicle turn-off event. The module possessing the token determines the available signal strength on its respective communication network. If the available signal strength is adequate for reliable data communication with the remote call center, the module retains possession of the token and periodically wakes-up to check for incoming messages from the call center. If the available signal strength is inadequate, the module possessing the token passes the token to the other module, after which that module periodically wakes-up to check for incoming messages from the call center.

DESCRIPTION OF THE PREFERRED EMBODIMENT

Figure 1:
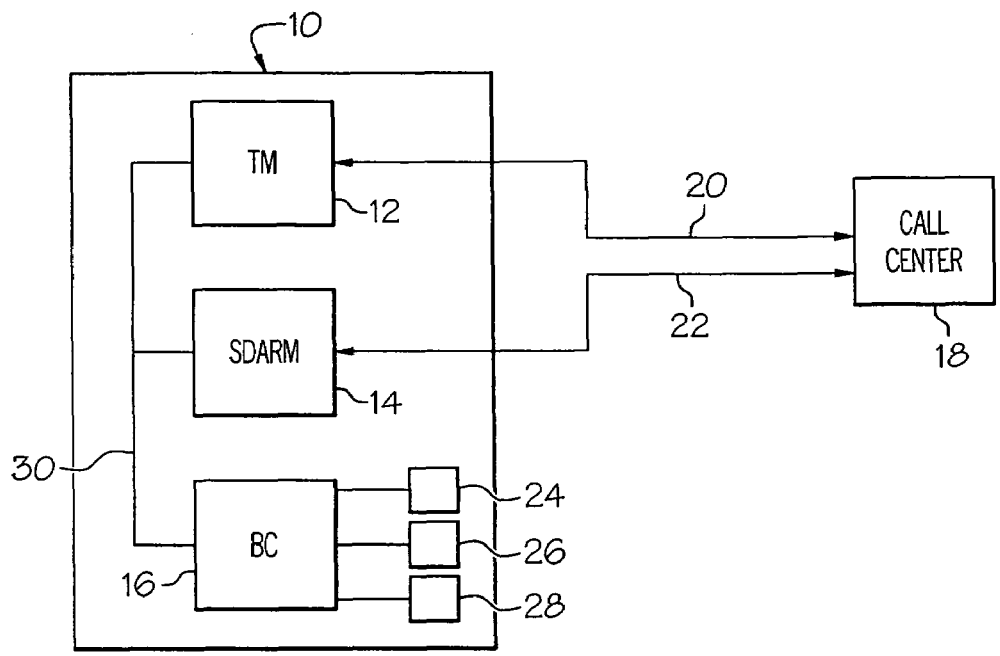
FIG. 1 is a diagram of a vehicle equipped with a telematics module, a SDAR module, and a body computer according to the present invention.

Referring to FIG. 1, the reference numeral 10 generally designates a motor vehicle equipped with a telematics module (TM) 12, a SDAR module (SDSRM) 14 and a body computer (BC) 16. The telematics module 12 communicates with a remote message transmission facility such as a call center 18 by way of a cell communication channel 20, and the SDAR module 14 communicates with the same call center 18 by way of a satellite communication channel 22. The body computer 16 interfaces with various electrically activated components and systems, including a horn relay 24, a lighting relay 26 and a door lock/unlock module 28. A vehicle bus 30 supports data communication among the telematics module 12, the SDAR module 14 and the body computer 16.

The telematics module 12 is configured to receive data messages from the call center 18 while the vehicle 10 is inactive (i.e., parked) for performing certain vehicle control functions. For example, a vehicle owner (or authorized operator) who has locked the keys in the vehicle 10 or who cannot find the vehicle 10 in a crowded parking lot can inform a call center operator of the problem. The call center operator, upon verifying the identity of the party, transmits a data message to the vehicle 10, including a vehicle control command indicating a desired action such as unlocking the doors, sounding the horn or flashing the headlights. The call center 18 simultaneously transmits the data message to telematics module 12 via cell communication channel 20 and to SDAR module 14 via satellite communication channel 22. As explained below, one of the telematics module 12 and SDAR module 14 is responsible for servicing call center messages while the vehicle 10 is inactive, and that module periodically wakes-up to determine if any call center messages have been received. If so, the module responsible for servicing call center messages transmits the vehicle control command to body computer 16 via vehicle bus 30, and the body computer 16 decodes the vehicle control command and performs the indicated control function, such as activating the door lock/unlock module 28 to unlock the doors of vehicle 10.

The call center operator does not need to know which of the wireless control modules 12 or 14 is responsible for servicing a given data message because the message is sent to both modules. As explained herein, the decision as to which module 12 or 14 is responsible for servicing call center messages is determined based on the available signal strengths of the communication channels 20 and 22. In the illustrated embodiment, the responsibility for servicing call center messages is designated by a software communication token that is transferred from the body computer 16 to the telematics module 12 at vehicle turn-off. Alternatively, the body computer 16 can be programmed to transfer the communication token to the SDAR module 14 at vehicle turn-off.

Communication over the cell channel 20 may be preferred because adequate signal strength is usually available in obstructed parking locations such as in airport or urban covered parking decks. However, communications over cell channel 20 may be unavailable in remote rural settings, in which case satellite channel 22 will be the preferred communication channel. In any event, the module 12 or 14 having possession of the communication token periodically wakes-up from a sleep mode during periods of vehicle inactivity to check for data messages from the call center 18 and to direct any received vehicle control commands to body computer 16 for processing. The communication token may include a current budget that represents a maximum power consumption allowance for the period of vehicle inactivity, and the periodic wake-ups continue until the vehicle 10 is re-started or the current budget has been consumed. Preferably, the SDAR module 14 is also configured to transfer the token back to the telematics module 12 should the satellite communication channel 22 become inadequate for reliable communication due to inclement weather, for example.

Figure 2:
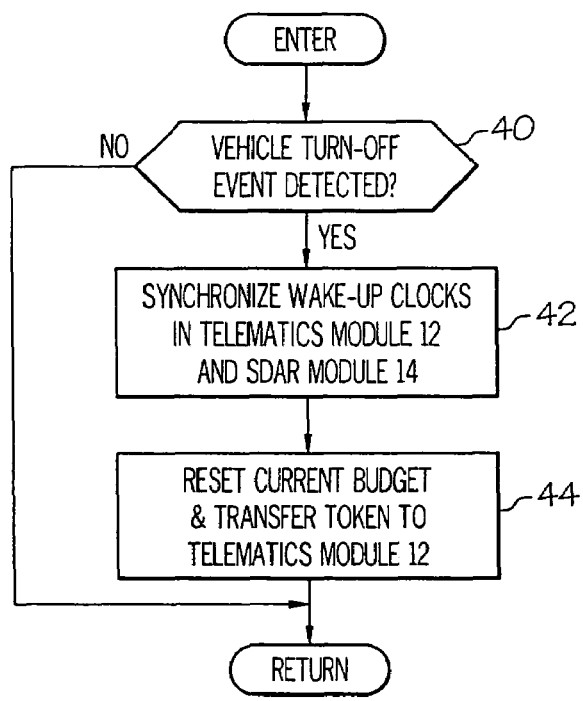
FIG. 2 is a flow diagram representing a software routine executed by the body computer of FIG. 1 according to the present invention.

The flow diagram of FIG. 2 represents a portion of a software routine executed by body computer 16 for initializing the communication token at vehicle turn-off. When a vehicle turn-off event is detected at block 40, the blocks 42 are 44 are executed to synchronize the internal wake-up clocks of telematics module 12 and SDAR module 14, to reset the current budget for the ensuing period of vehicle inactivity, and to transfer the communication token to telematics module 12 via vehicle bus 30. Synchronizing the wake-up clocks of telematics module 12 and SDAR module 14 ensures that the desired wake-up frequency for processing vehicle control commands will be preserved regardless of which module possesses the communication token. And as indicated above, it may be desired in certain applications or regions to initially transfer the communication token to the SDAR module 14 instead of the telematics module 12.

Figure 3:
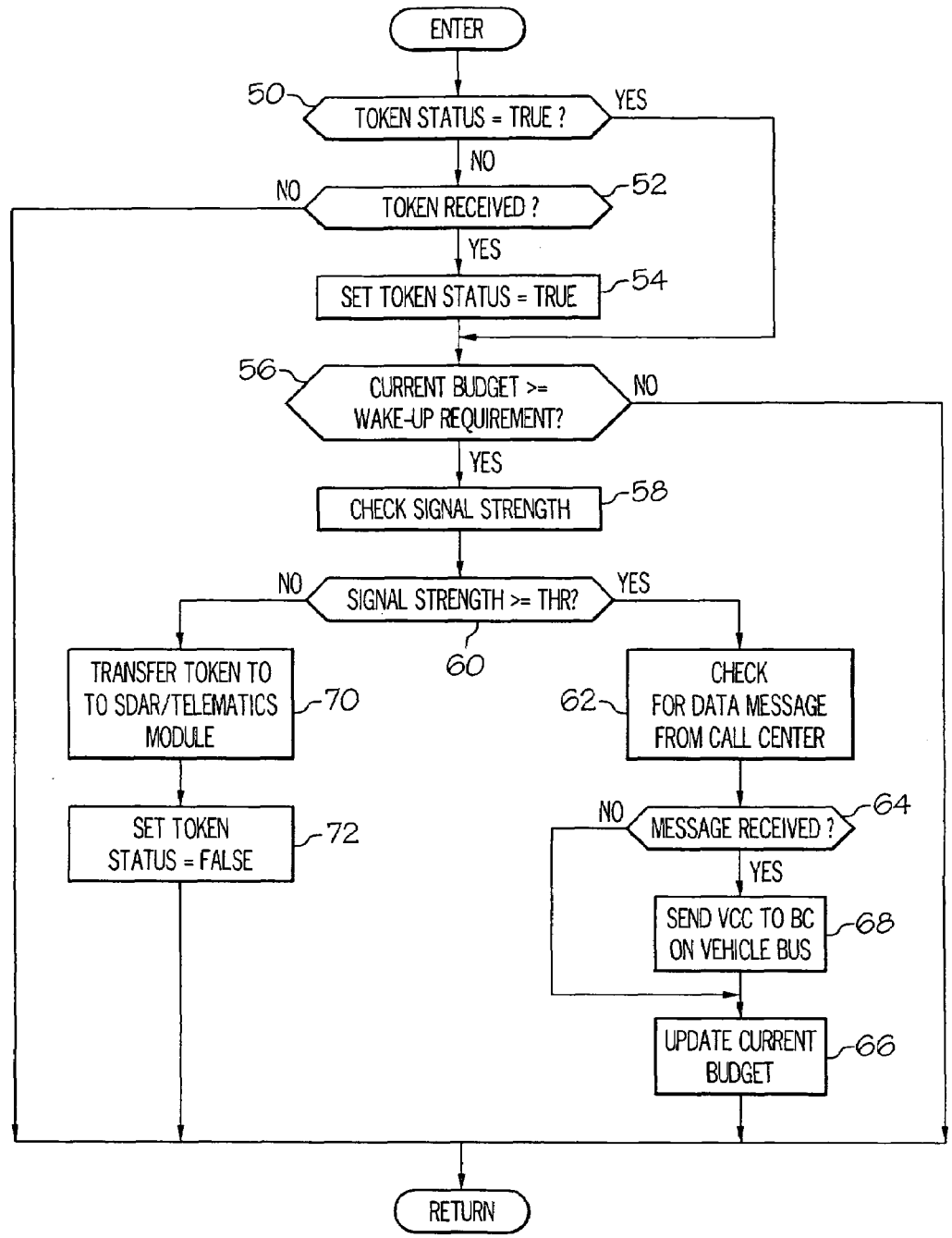
FIG. 3 is a flow diagram representing a software routine executed by both the telematics and SDAR modules of FIG. 1 according to the present invention.

The flow diagram of FIG. 3 represents a wake-up software routine that is executed by telematics module 12 and SDAR module 14 at each wake-up event during a period of vehicle inactivity. The block 50 is first executed to check the state of a Token Status flag used to indicate possession or non-possession of the communication token. The flag is initialized to False, causing block 52 to determine if the token has been received via the vehicle bus 30. If so, block 54 sets the Token Status flag to True; if not, the routine is exited, and the module returns to the sleep mode. If the module has possession of the communication token (i.e., Token Status flag=True), the block 56 determines if the current budget associated with the token is at least as great as the wake-up power consumption requirement. If not, the routine is exited, and the module returns to the sleep mode. If block 56 is answered in the affirmative, however, the blocks 58 and 60 are executed to determine if the available signal strength of the respective communication channel 20 or 22 equals or exceeds a threshold THR. If so, the module is capable of reliably communicating with the call center 18, and blocks 62 and 64 are executed to determine if a vehicle control command message has been received from the call center 18. If not, block 66 is executed to update the current budget based on the power consumed in executing the routine, whereafter the module returns to the sleep mode. If a message has been received, the block 68 is executed prior to block 66 for sending the vehicle control command (VCC) to the body computer 16 via vehicle bus 30. The body computer 16, in turn, receives and processes the vehicle control command by performing the commanded vehicle function.

If the available signal strength of the communication channel 20 or 22 for the module executing the routine of FIG. 3 is inadequate to support reliable communications with call center 18, block 60 of the routine will be answered in the negative. In this case, blocks 70 and 72 are executed to transfer the communication token to the other wireless communication module and to set the Token Status flag to False, completing the routine.

In summary, the method of the present invention provides a way of utilizing the communication capabilities of both telematics-based and satellite-based on-board wireless control modules to optimize communication of vehicle control commands from a call center to an inactive vehicle. While the present invention has been described with respect to the illustrated embodiment, it is recognized that numerous modifications and variations in addition to those mentioned herein will occur to those skilled in the art. For example, the body computer 16 may be omitted, and the wireless control modules 12 and 14 may directly interface with the relays 24-26 and door lock/unlock module 28, and so forth. Accordingly, it is intended that the invention not be limited to the disclosed embodiment, but that it have the full scope permitted by the language of the following claims.

The invention claimed is:

1. A method of controlling communications between a message transmission facility and a vehicle having a first wireless module that receives messages from said facility by way of a cell communication network and a second wireless module that receives messages from said facility by way of a satellite communication network, the method comprising the steps of:

establishing an initial communication receiving mode at turn-off of said vehicle by passing a software token to a selected one of said first and second wireless modules;

detecting an available communication signal strength for the selected wireless module, and passing said software token from the selected wireless module to the other of said first and second wireless modules if said available communication signal strength is less than a threshold;

transmitting a message from said facility to said first and second wireless modules; and identifying which of said wireless modules possesses said software token and periodically activating the identified wireless module to check for messages transmitted from said facility assigning a current budget to said software token, said current budget having an initial value indicative of a power consumption allowance for a period of inactivity following the turn-off of said vehicle; reducing the value of said current budget based on a power consumption of the wireless module that possesses said software token; and discontinuing the periodic activation of the identified wireless module when said current budget has been reduced to a reference value.

2. The method of claim 1, where the message transmitted from said facility to said first and second wireless modules includes a control command for said vehicle, and the method includes the step of:

initiating a vehicle control function corresponding to said control command when the identified wireless module confirms receipt of said message.

3. The method of claim 1, where said first wireless module is a telematics module and said second wireless module is a SDAR module.

* * * * *